United States Patent
Marquezan et al.

(10) Patent No.: US 11,240,096 B2
(45) Date of Patent: Feb. 1, 2022

(54) METHOD FOR USING CONTEXT AWARENESS FOR THE COORDINATION OF MANAGEMENT AND MOBILE NETWORK SERVICE OPERATION PLANES

(71) Applicant: Huawei Technologies Co., Ltd., Shenzhen (CN)

(72) Inventors: Clarissa Marquezan, Munich (DE); Xueli An, Munich (DE); Riccardo Trivisonno, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 220 days.

(21) Appl. No.: 16/714,061

(22) Filed: Dec. 13, 2019

(65) Prior Publication Data
US 2020/0119995 A1  Apr. 16, 2020

Related U.S. Application Data

(63) Continuation of application No. PCT/EP2017/064398, filed on Jun. 13, 2017.

(51) Int. Cl.
*H04L 12/24* (2006.01)

(52) U.S. Cl.
CPC .......... *H04L 41/042* (2013.01); *H04L 41/082* (2013.01); *H04L 41/0893* (2013.01);
(Continued)

(58) Field of Classification Search
CPC . H04L 41/0896; H04L 41/042; H04L 41/082; H04L 41/0893; H04L 41/12; H04L 41/5054; H04L 41/5051
See application file for complete search history.

(56) References Cited

U.S. PATENT DOCUMENTS

2016/0062746 A1* 3/2016 Chiosi .................. G06F 8/35
                                                          717/104
2017/0141973 A1  5/2017 Vrzic
(Continued)

FOREIGN PATENT DOCUMENTS

CN    104639653 A    5/2015
CN    105376083 A    3/2016
(Continued)

OTHER PUBLICATIONS

Geng et al., "Network Slicing Architecture draft-geng-netslices-architecture-00," Network Working Group, Internet Draft, pp. 1-12, Internet Engineering Task Force, Fremont, CA (Mar. 13, 2017).
(Continued)

*Primary Examiner* — Tonia L Dollinger
*Assistant Examiner* — Joseph M Cousins
(74) *Attorney, Agent, or Firm* — Leydig, Voit & Mayer, Ltd.

(57) ABSTRACT

The present application relates to a mobile core network (MCN) supporting end-to-end (E2E) network slicing, which comprises a controlling entity (CA_NF), one or more network function (NF) entities extended with functionalities (CA-NFExt), a network management entity (OSS) extended with functionalities (CA_OSSExt), and a coordination entity (CA_CF). The CA_NF communicates with the CA_OSSExt through the CA_CF using interfaces (If-CA_MP and If-CAC_OSS), and with the CA-NFExts using a respective interface (If-CA_NF) and/or other NFs interfaces. Based on information received from the OSS and the NF entities, the CA_NF generates a context with a certain type, sends, based on the generated context, context-related information towards entities impacted by the generated context amongst the NF entities and the OSS, and blocks, for a period of time, a transmission of any generated context towards the NF
(Continued)

entities upon receiving, from the OSS, a notification message once the OSS decides to enforce a change.

15 Claims, 9 Drawing Sheets

(52) U.S. Cl.
CPC .......... *H04L 41/0896* (2013.01); *H04L 41/12* (2013.01); *H04L 41/5054* (2013.01)

(56) References Cited

U.S. PATENT DOCUMENTS

| | | | |
|---|---|---|---|
| 2017/0244614 A1* | 8/2017 | Wu | H04L 65/80 |
| 2018/0285166 A1* | 10/2018 | Roy | G06F 11/34 |
| 2018/0332485 A1* | 11/2018 | Senarath | H04W 16/02 |

FOREIGN PATENT DOCUMENTS

| | | |
|---|---|---|
| CN | 105453485 A | 3/2016 |
| CN | 106375987 A | 2/2017 |
| EP | 2608609 B1 | 8/2016 |

OTHER PUBLICATIONS

"Output—Draft Recommendation of "IMT-2020 Network Management Framework (Y.IMT-2020-mgmt-frame)," (version 0.2)," Telecommunication Standardization Sector, Study Group 13 e-meetings, pp. 1-54, International Telecommunication Union, Geneva, Switzerland (Apr. 19 & May 23, 2017).

Chatras et al., "NFV Enabling Network Slicing for 5G," XP033085379, pp. 1-8, Institute of Electrical and Electronics Engineers, New York, New York (Mar. 2017).

Makhjani et al., "Network Slicing Use Cases: Network Customization and Differentiated Services draft-netslices-usecases-00," XP015119938, pp. 1-46, Internet Engineering Task Force, Fremont, CA (Jun. 1, 2017).

"3rd Generation Partnership Project; Technical Specification Group Services and System Aspects; Telecommunication management; Study on management and orchestration of network slicing for next generation network (Release 14)," 3GPP TR 28.801 V1.1.0, pp. 1-60, 3rd Generation Partnership Project, Valbonne, France (Mar. 2017).

"3rd Generation Partnership Project; Technical Specification Group Services and System Aspects; Telecommunication management; Study on management and orchestration architecture of next generation networks and services (Release 14)," 3GPP TR 28.800 V0.6.0, pp. 1-12, 3rd Generation Partnership Project, Valbonne, France (Feb. 2017).

"3rd Generation Partnership Project; Technical Specification Group Services and System Aspects; Study on Architecture for Next Generation System (Release 14)," 3GPP TR 23.799 V14.0.0, pp. 1-522, 3rd Generation Partnership Project, Valbonne, France (Dec. 2016).

"3rd Generation Partnership Project; Technical Specification Group Radio Access Network; Study on Context Aware Service Delivery in RAN for LTE; (Release 14)," 3GPP TR 36.933 V14.0.0, pp. 1-18, 3rd Generation Partnership Project, Valbonne, France (Mar. 2017).

"3rd Generation Partnership Project; Technical Specification Group Services and System Aspects; System Architecture for the 5G System; Stage 2 (Release 15)," 3GPP TS 23.501 V1.0.0, pp. 1-146, 3rd Generation Partnership Project, Valbonne, France Jun. 2017).

"Presentation of TR 23.501: System Architecture for the 5G System (Release 15) to TSG SA for Approval," 3GPP TSG SA Meeting #76, West Palm Beach, Cover Sheet, pp. 1-2, 3rd Generation Partnership Project, Valbonne, France (Jun. 7-9, 2017).

Taleb et al., "Towards elastic application-oriented bearer management for enhancing QoE in LTE networks," 2016 IEEE Wireless Communications and Networking Conference, Doha, Qatar, pp. 1-6, Institute of Electrical and Electronics Engineers, New York, New York (Apr. 3-6, 2016).

"Network Functions Virtualisation (NFV); Management and Orchestration; Report on Architectural Options," ETSI GS NFV-IFA 009 V1.1.1, pp. 1-31, European Telecommunications Standards Institute, Sophia Antipolis, France (Jul. 2016).

"5G Service-Guaranteed Network Slicing White Paper," pp. 1-26, China Mobile Communications, Huawei Tech. Co. Ltd., Deustche Telekom AG, Volkswagen, Mobile World Conference 2017, Barcelona, Spain (Feb. 28, 2017).

* cited by examiner

METHOD FOR USING CONTEXT AWARENESS FOR THE COORDINATION OF MANAGEMENT AND MOBILE NETWORK SERVICE OPERATION PLANES

CROSS-REFERENCE TO RELATED APPLICATIONS

This application is a continuation of International Patent Application No. PCT/EP2017/064398, filed on Jun. 13, 2017, the disclosure of which is hereby incorporated by reference in its entirety.

TECHNICAL FIELD

The present application relates to the field of wireless communications, and more particularly, to the design of a mobile core network (MCN) architecture for next generation systems.

BACKGROUND

Technology trends in the fields of softwarization, virtualization, cloud and mobile edge computing have increasingly spread their influence in the evolution of mobile telecommunication systems.

Focusing on the mobile network domain, some of the latest fourth generation (4G) features (e.g., 3GPP release 14: control and user plane separation) as well as key design principles of fifth generation (5G) systems (5GS) (e.g., 3GPP release 15: support of network slicing and architecture modularization) clearly manifest the attempt to leverage the potentials of network function virtualization and software defined networking.

Network slicing is a key feature of 5GS whose purpose is to enable mobile network operators to create customized networks, which provide optimized solutions for different market scenarios including the integration of vertical industries within the telecommunications domain. This may lead to diverse requirements in terms of supported functionality, performance and isolation, as disclosed in the technical report entitled: 3GPP TR 23.799, "Study on architecture for next generation system", v14.0.0. The technical specification entitled: 3GPP TS 23.501, "System architecture for the 5G system", v0.3.0, defines a network slice as a complete logical network that comprises a set of network functions (NFs) and corresponding resources, which are necessary to provide certain network capabilities and network characteristics. A network slice includes both an access network (AN) and a core network (CN). A network slice instance (NSI) is defined as the instantiation of a network slice, i.e., as a deployed set of network functions delivering the intended network slice services.

The support of network slicing is enabled by the architecture modularization design principle stating that the 5GS reference architecture features the core network decomposition into orthogonal sets of network functions for control plane (CP or C-plane) and user plane (UP or U-plane). The control plane network functions are classified as common control network functions (CCNFs) and slice-specific control network functions (SCNFs), in order to distinguish between the NFs that may be shared among multiple NSIs and those that are NSI-specific.

Based on the above, it is clear that the extreme 5GS flexibility will come at a price of upcoming deployment scenarios of an increased complexity in terms of network planning and engineering, network configuration, network management and network optimization, thereby blurring the boundaries between the control and management domains.

In this scenario, enhanced network operational models and mechanism, which tighten the relationship between management, control and user planes, will have to emerge.

In 4G, information management is limited within physical network entities for several reasons. First, there is no requirement for information unification, while each 3GPP-type physical box (e.g., the subcomponents of the evolved packet core (EPC) like the mobility management entity (MME), the serving gateway (SGW) and the packet data network (PDN) gateway (PGW) amongst others) may cover a wide range for service provisioning, so that self-optimization is sufficient. Second, a network is very static and the services are also limited. For example, there are only data and voice-over-long-term-evolution (VoLTE) services for mobile broadband (MBB). Hence, there is no foreseen dynamicity that requires complex information processing. In comparison, the next generation mobile system will support a wide variety of devices (e.g., smartphones, wearable devices, smart cars, electronic household appliances or industrial equipment amongst others), thereby requiring network services with diversified network provisioning requirements. Thus, the next generation mobile system is envisioned to be more flexible and efficient to handle different use cases. To do so, monolithic network entity like MME shall disappear and be replaced with finer granularity network functions (e.g., mobility management or session management amongst others) together with network functions virtualization (NFV) and software-defined networking (SDN) technology. Moreover, the distribution of user plane functions will also invoke U-plane dynamicity. Such system dynamicity will have a high demand in terms of system automation in order to avoid that the operation of the system would be too complicated and expensive.

In this case, the network management plane (MP), where the network entity information is collected, for example, via operations support systems (OSS), is expected to play an essential role to enable system automation. However, the major limitation of a conventional network management plane (MP) is that the information collected from the production network is not for control purpose. For instance, it can be only used as historical data for fault analysis or statistic purpose, which is normally also required by human intervention. In order to enable full automation of the system, it is important to have a mechanism to generate a useful context based on the existing information that has been collected from the network management plane (MP), and it is also important to feed such a useful context back to the network service layer for controlling the purpose of, for example, improving the system operation efficiency or avoiding conflict operations due to a lack of information exchange. For instance, a C-plane function could change a user from a U-plane gateway denoted by A to another U-plane gateway denoted by B because it has noticed a prolonged latency on the gateway A, while, in the infrastructure, the gateway A is in a first data center (DC) (designated by DC #1) and the gateway B is in a second DC (designated by DC #2). At the infrastructure layer, the virtual machine (VM) that hosts the gateway B could be migrated to the DC #1 due to maintenance purpose. From such simultaneous and non-coordinated changes in both planes, it would result an increase in the delays that were occurring or a perception, by the users, of the same delay after the changes.

SUMMARY

The present application describes solutions for the control plane (CP) as well as the management plane (MP) of mobile networks in order to close the decision-making loop between the CP and MP entities using context awareness and thereby optimize the mobile networks operation.

According to a first aspect, the application relates to a controlling entity (CA_NF) communicating with a network management entity (OSS) and one or more network function (NF) entities. The controlling entity (CA_NF) is configured to receive information from the one or more NF entities and from the network management entity (OSS), the received information being relevant to generate a context, configured to generate the context based on the received information, and, based on the generated context, configured to send context-related information towards any entity that is impacted by the generated context amongst the one or more NF entities and the network management entity (OSS).

According to a further implementation form of the first aspect, the information from the network management entity (OSS) is received using a first interface (If-CA_MP), and the information from the one or more NF entities is received using a respective second interface (If-CA_NF).

According to a further implementation form of the first aspect, the context-related information is sent towards the network management entity (OSS) using the first interface (If-CA_MP) when the network management entity (OSS) is impacted by the generated context, and the context-related information is sent towards one amongst the one or more NF entities using the second interface (If-CA_NF) when the one amongst the one or more NF entities is impacted by the generated context.

According to a further implementation form of the first aspect, the context-related information comprises the generated context when the entity that is impacted by the generated context is an entity susceptible to enforce a change upon receiving the generated context, and the context-related information comprises a notification message about a type of the generated context when the entity that is impacted by the generated context is an entity susceptible to be influenced by the enforced change.

According to a further implementation form of the first aspect, the type of the generated context has a format giving an indication about only a first entity (CP, MP) comprising the entity that is susceptible to enforce the change or about the first entity (CP, MP) comprising the entity that is susceptible to enforce the change together with a second entity (MP, CP) comprising the entity that is susceptible to be influenced by the enforced change. Further, the second entity (MP, CP) is other than the first entity (CP, MP), and the one or more NF entities are deployed in the first entity and the network management entity (OSS) is deployed in the second entity, or the one or more NF entities are deployed in the second entity and the network management entity (OSS) is deployed in the first entity.

According to a further implementation form of the first aspect, the controlling entity (CA_NF) is configured to block, for a period of time, a transmission of any generated context towards the one or more NF entities upon receiving a notification message from the network management entity (OSS), wherein the notification message is generated by the network management entity (OSS) once the network management entity (OSS) decides to enforce the change upon receiving the generated context from the controlling entity (CA_NF), and wherein the period of time, during which the transmission is blocked, is greater than or equal to a time required for the network management entity (OSS) to enforce the change.

According to a second aspect, the application relates to a network management entity (OSS) as specified in the first aspect and/or in any one of the implementation forms of the first aspect.

According to a further implementation form of the second aspect, the network management entity (OSS) is configured to be extended with functionalities as to obtain an extended network management entity (CA_OSSExt), the functionalities allowing the network management entity (OSS) to communicate with a controlling entity (CA_NF) as claimed in the first aspect and/or in any one of the implementation forms of the first aspect. Further, the extended network management entity (CA_OSSExt) is configured to send the information that is relevant to generate the context towards the controlling entity (CA_NF), and configured to receive, when the network management entity (OSS) is impacted by the generated context, the context-related information from the controlling entity (CA_NF).

According to a further implementation form of the second aspect, the extended network management entity (CA_OSSExt) communicates with the controlling entity (CA_NF) through a communication with a coordination entity (CA_CF).

According to a further implementation form of the second aspect, the extended network management entity (CA_OSSExt) communicates with the coordination entity (CA_CF) using a third interface (If-CAC_OSS).

According to a further implementation form of the second aspect, the extended network management entity (CA_OSSExt) is configured to block, for a period of time, any change at the network management entity (OSS) upon receiving, from the controlling entity (CA_NF), a notification message as specified in an implementation form of the first aspect. Further, the period of time, during which any change is blocked, is greater than or equal to a time required for the one or more NF entities being impacted by the generated context to enforce the change.

According to a third aspect, the application relates to a network function (NF) entity as specified in the preceding aspects and/or in any implementation forms of the preceding aspects.

According to a further implementation form of the third aspect, the network function (NF) entity is configured to be extended with functionalities as to obtain an extended NF entity (CA_NFExt), the functionalities allowing the NF entity to communicate with the controlling entity (CA_NF). Further, the extended NF entity (CA_NFExt) is configured to send the information that is relevant to generate the context towards the controlling entity (CA_NF), and configured to receive, when the NF entity is impacted by the generated context, the context-related information from the controlling entity (CA_NF).

According to a fourth aspect, the application relates to a coordination entity (CA_CF) as specified in implementation forms of the second aspect.

According to a fifth aspect, the application relates to a mobile core network (MCN) supporting (end-to-end) E2E network slicing. The mobile core network (MCN) comprises a controlling entity (CA_NF) as claimed in the first aspect and/or in any one of the implementation forms of the first aspect, a network management entity (OSS) as claimed in the second aspect and/or in any one of the implementation forms of the second aspect, one or more network function (NF) entities as individually claimed in the third aspect and/or in any one of the implementation forms of the third aspect, and a coordination entity (CA_CF) as claimed in the fourth aspect.

According to a further implementation form of the fifth aspect, the network management entity (OSS) and the coordination entity (CA-CF) are implemented into a management plane (MP), and the controlling entity (CA_NF) and the one or more NF entities are implemented in a control plane (CP) and/or a user plane (UP), wherein the CP and the MP are respectively one amongst the first entity (CP, MP) and the second entity (MP, CP) as specified in an implementation form of the first aspect.

According to a further implementation form of the fifth aspect, the mobile core network (MCN) is configured to have a network function virtualization (NFV) framework.

According to a further implementation form of the fifth aspect, the one or more network function (NF) entities and the network management entity (OSS) are part of the NFV framework, and the controlling entity (CA_NF) and the coordination entity (CA_CF) are standalone entities.

According to a further implementation form of the fifth aspect, the controlling entity (CA_NF), the one or more network function (NF) entities, the network management entity (OSS) and the coordination entity (CA_CF) are part of the NFV framework.

According to a sixth aspect, the application relates to a method for communicating with a network management entity (OSS) and one or more network function (NF) entities. The method comprises the step of receiving, at the controlling entity (CA_NF), information from the one or more NF entities and from the network management entity (OSS), the received information being relevant to generate a context, the step of generating, at the controlling entity (CA_NF), the context based on the received information, and, based on the generated context, the step of sending, from the controlling entity (CA_NF), context-related information towards any entity that is impacted by the generated context amongst the one or more NF entities and the network management entity (OSS).

According to a further implementation form of the sixth aspect, the method comprises the step of blocking, at the controlling entity (CA_NF) and for a period of time, a transmission of any generated context towards the one or more NF entities upon receiving a notification message from the network management entity (OSS). Further, the notification message is generated by the network management entity (OSS) once the network management entity (OSS) decides to enforce a change upon receiving the generated context derived from the context-related information, and the period of time, during which the transmission is blocked, is greater than or equal to a time required for the network management entity (OSS) to enforce the change.

According to a seventh aspect, the application relates to a method for communicating with a controlling entity (CA_NF) and one or more network function (NF) entities. The method comprises the step of sending, from the network management entity (OSS), information towards the controlling entity (CA_NF), the sent information being relevant to generate a context at the controlling entity (CA_NF), and, based on the generated context, the step of receiving, at the network management entity (OSS) and from the controlling entity (CA_NF), context-related information when the network management entity (OSS) is impacted by the generated context.

According to a further implementation form of the seventh aspect, the method comprises the step of blocking, for a period of time, any change at the network management entity (OSS) upon receiving, at the network management entity (OSS) and from the controlling entity (CA_NF), a notification message about a type of the generated context. Further, the one or more NF entities are impacted by the generated context by being susceptible to enforce the change, the network management entity (OSS) is impacted by the generated context by being susceptible to be influenced by the enforced change, and the period of time, during which any change at the network management entity (OSS) is blocked, is greater than or equal to a time required for the one or more NF entities being impacted by the generated context to enforce the change.

According to an eighth aspect, the application relates to a computer program comprising a program code for performing the method according to the sixth aspect and/or any one of the implementation forms of the sixth aspect and/or the seventh aspect and/or any one of the implementation forms of the seventh aspect, when executed on a computer.

Thereby, the method can be performed in an automatic and repeatable manner.

The computer program can be performed by the above apparatuses.

More specifically, it should be noted that all the above apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the Internet.

It shall further be understood that a preferred embodiment of the application can also be any combination of the dependent claims or above embodiments with the respective independent claim.

These and other aspects of the application will be apparent and elucidated with reference to the embodiments described hereinafter.

BRIEF DESCRIPTION OF THE DRAWINGS

In the following detailed portion of the present disclosure, the application will be explained in more detail with reference to the exemplary embodiments shown in the drawings, in which.

Identical reference signs are used for identical or at least functionally equivalent features.

DETAILED DESCRIPTION OF EMBODIMENTS OF THE APPLICATION

A network slice may be defined as a set of functions that are bundled together for providing a specific mobile network service. A network slice may comprise an access network (AN), a transport network (TN) and a core network (CN), while the CN may in turn comprise user plane (UP) and control plane (CP) functions. The UP function (UPF) concept used in this application refers to the network functions (NFs) or network function (NF) entities that are used in the CN in order to process the UP traffic and thereby provide certain network services. An example of UPF may be a mobility anchoring function. Moreover, the CP function (CPF) concept used in this application refers to the NFs or NF entities that are used in the CN in order to perform the CPFs for a terminal (e.g., a user equipment (UE)) while it is connected to the mobile CN.

Figure 1:
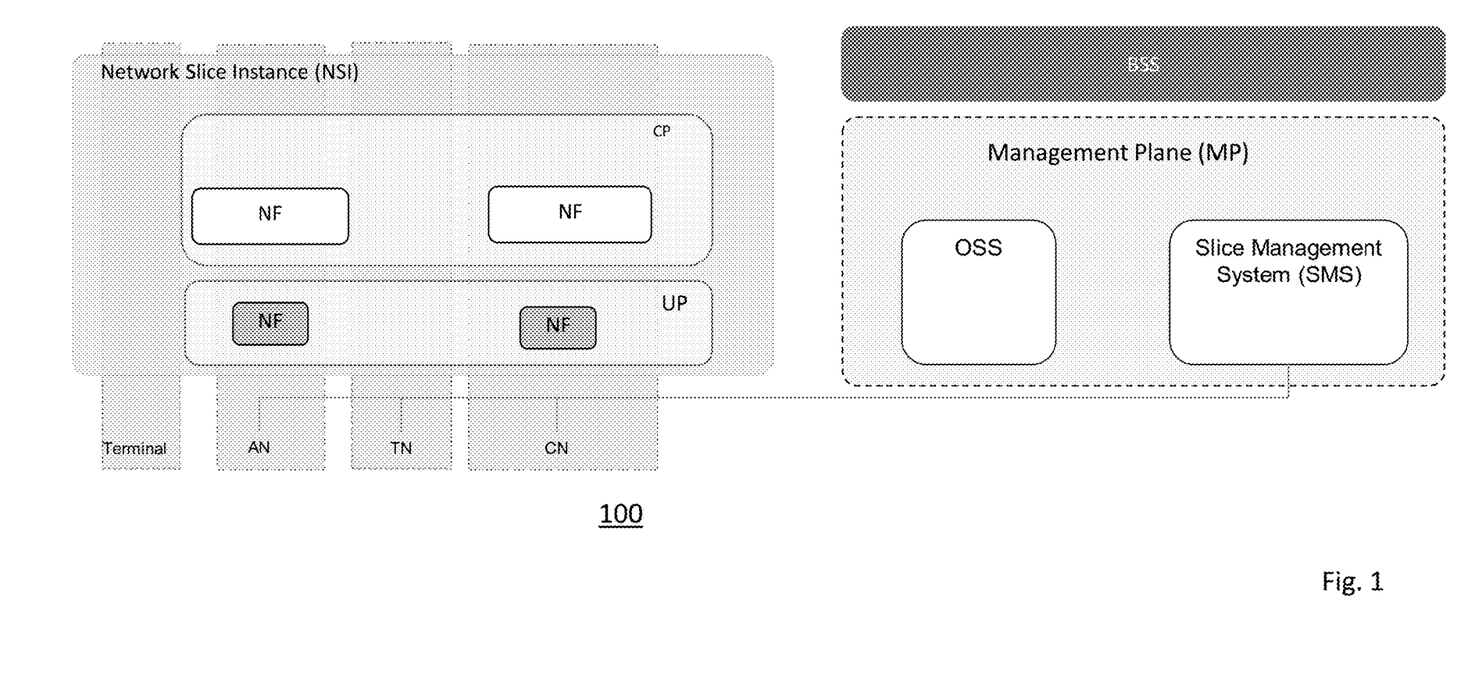
FIG. 1 shows a typical end-to-end (E2E) slicing architecture 100 in a simplified version.

FIG. 1 shows a typical end-to-end (E2E) slicing architecture 100 in a simplified version. An E2E slicing architecture may define the entities that are involved in the operation and management of a network slice instance (NSI). As divulged in the technical report entitled: 3GPP TR 28.801, "Study on management and orchestration of network slicing for next generation network", a NSI may be defined as "a set of network functions and the resources for these network functions which are arranged and configured, forming a complete logical network to meet certain network characteristics". A more detailed view of such a NSI may, for example, be found in the white paper entitled: "5G Service-guaranteed network slicing" and released at the mobile world congress 2017 (MWC 2017) in Barcelona.

On the left side of FIG. 1, the NSI is depicted with its network function (NF) entities deployed in the control plane (CP) and the user plane (UP), as well as its resources located in the access network (AN), the transport network (TN) and the core network (CN). On the right side of FIG. 1, the management plane (MP) is depicted with its entities and functions related to the management of a network slice, its resources, network entities and network function (NF) entities. As illustrated, the MP entities may be the business support system (BSS), the operations support systems (OSS) as a network management entity, and the slice management system (SMS). The BSS may be responsible for a high-level management in the business layer, while the network management entity (OSS) may remain with the task of managing the entities of the network and the SMS may be responsible for managing the entities (AN, TN, CN) associated with the NSI. Data center resources, which host third party applications and/or network functions, may also be included in such an E2E slicing architecture.

In the following, the proposed application will be illustrated based on a 5G framework supporting network slicing (NS). However, it should be noted that the present application can also be applied to any earlier generation systems not featuring NS or to any future systems not supporting NS.

Figure 2:
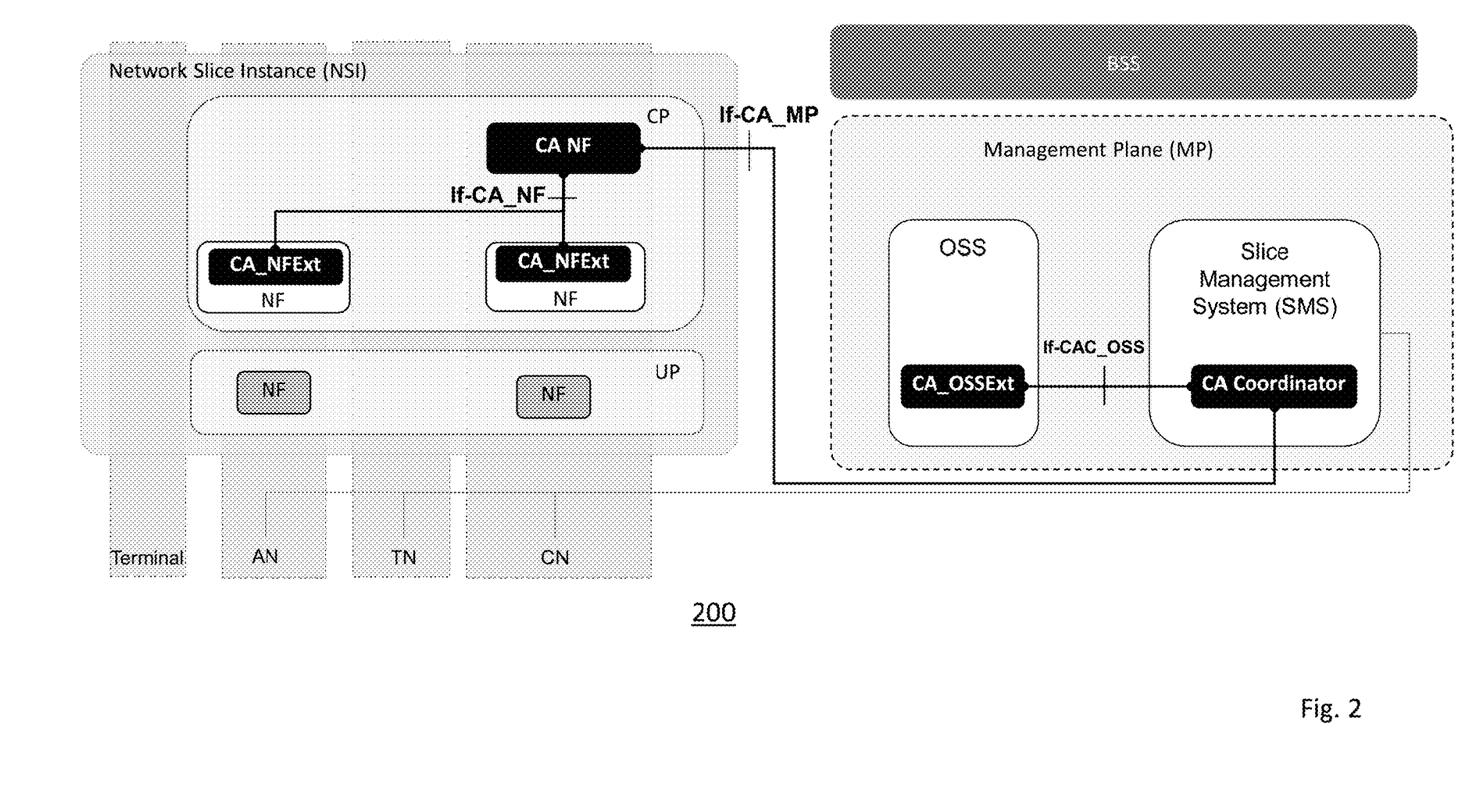
FIG. 2 shows an enhanced end-to-end (E2E) slicing architecture 200 with functionality extensions and communication interfaces, according to an embodiment of the present application.

As depicted in the enhanced end-to-end (E2E) slicing architecture 200 of FIG. 2, the typical end-to-end (E2E) slicing architecture 100 of FIG. 1 has been extended with specific function entities (CA_NF, CA_OSSExt, CA_CF, CA_NFExt) and interfaces (If-CA_NF, If-CA_MP, If-CA-C_OSS) needed to enable a context-awareness mechanism to close a decision-making loop between the CP and MP entities.

Amongst the specific function entities, a controlling entity (CA_NF), also named a context awareness network function entity (CA_NF), may be configured to communicate in both directions with the network management entity (OSS) through the slice management system (SMS), and also configured to communicate in both directions with one or more network function (NF) entities of the NSI. In particular, the controlling entity (CA_NF) may be configured to receive information relevant to generate a context from the one or more NF entities using a respective dedicated interface (If-CA_NF) and from the network management entity (OSS) using a dedicated interface (If-CA_MP). It may further be configured to generate the context based on the received information, and, based on the generated context, it may also be configured to send context-related information (e.g., the generated context or a notification message according to whether a change is to be enforced or is already enforced, respectively) towards any entity that is impacted by the generated context amongst the one or more NF entities and the network management entity (OSS).

As regards the context-related information, it may be sent towards the network management entity (OSS) using the dedicated interface (If-CA_MP) when the network management entity (OSS) is impacted by the generated context, and it may also be sent towards one amongst the one or more NF entities using the respective dedicated interface (If-CA_NF) when the one amongst the one or more NF entities is impacted by the generated context. Furthermore, the context-related information may comprise the generated context when the entity that is impacted by the generated context is an entity susceptible to enforce a change upon receiving the generated context.

On the other hand, the context-related information may comprise a notification message about a type of the generated context when the entity that is impacted by the generated context is an entity susceptible to be influenced by the enforced change. In an embodiment, the type of the generated context may have a format giving an indication about only a first entity (e.g., the CP or the MP) comprising the entity that is susceptible to enforce the change. Referring to this embodiment, the format of the type of the generated context may be described as a tuple (<first entity>), also simply denoted by the term "first entity only", where the first entity is the entity that enforces a certain change in its plane.

In another embodiment, the type of the generated context may have a format giving an indication about said first entity (e.g., the CP or the MP) together with a second entity (e.g., the MP if the first entity is the CP or the CP if the first entity is the MP), which is other than the first entity (CP, MP) and comprises the entity that is susceptible to be influenced by the enforced change. Referring to this other embodiment, the format of the type of the generated context may be described as a tuple (<first entity>, <second entity>), also simply denoted by the term "first entity-second entity", where the first entity is the entity that enforces a certain change in its plane and the second entity is the entity that might be influenced by the consequences of the enforced change by probably perceiving the effects of the change in its plane.

In a non-limiting enumeration, the type of the generated context may, for example, be described as "CP only", "CP-MP" or "MP-CP" amongst others. Thus, the type of context denoted by "CP only" will be related to changes to be enforced in the CP with minimal or no effect in the MP, and, in that case, no notification message will be sent. As regards the type of context denoted by "CP-MP", it will be related to changes in the CP that will probably affect the MP, and in that case, a notification message will be sent towards the specific function entities of the MP. For example, if the CP changes the gateway from the users, then the MP will see a traffic reduction in a part of the network and an increase in traffic in another part. As regards the type of context denoted by "MP-CP", it will be related to changes in the MP that will probably affect the CP, and a notification message will be sent towards the specific function entities of the CP.

In an embodiment, the one or more NF entities may be deployed in the first entity (CP, MP) and the network management entity (OSS) may be deployed in the second entity (MP, CP), and in another embodiment, the one or more NF entities may be deployed in the second entity (MP, CP) and the network management entity (OSS) may be deployed in the first entity (CP, MP).

In addition, the controlling entity (CA_NF) may be configured to block, for a period of time, a transmission of any generated context towards the one or more NF entities upon receiving a notification message from the network management entity (OSS). The notification message may be generated by the network management entity (OSS) once the network management entity (OSS) decides to enforce the change upon receiving the generated context from the controlling entity (CA_NF), and the period of time, during which the transmission is blocked, shall be greater than or equal to a time required for the network management entity (OSS) to enforce the change.

The network management entity (OSS) may be configured to be extended with functionalities so as to obtain an extended network management entity (CA_OSSExt), also named an extended context awareness operations support system (CA_OSSExt), these functionalities allowing the network management entity (OSS) to communicate with the controlling entity (CA_NF). In particular, the extended network management entity (CA_OSSExt) may be configured to send the information that is relevant to generate the context towards the controlling entity (CA_NF), and also configured to receive, when the network management entity (OSS) is impacted by the generated context, the context-related information from the controlling entity (CA_NF).

The extended network management entity (CA_OSSExt) may communicate with the controlling entity (CA_NF) through a communication with a coordination entity (CA_CF, also denoted by CA Coordinator), also named context awareness coordination function entity (CA_CF, CA Coordinator). On the other hand, the extended network management entity (CA_OSSExt) may communicate with the coordination entity (CA_CF, CA Coordinator) using a dedicated interface (If-CAC_OSS).

The extended network management entity (CA_OSSExt) may be further configured to block, for a period of time, any change at the network management entity (OSS) upon receiving the notification message from the controlling entity (CA_NF), and the period of time, during which any change is blocked, shall be greater than or equal to a time required for the one or more NF entities being impacted by the generated context to enforce the change.

As regards the network function (NF) entity, it may be configured to be extended with functionalities as to obtain an extended NF entity (CA_NFExt), these functionalities allowing the NF entity to communicate with the controlling entity (CA_NF). For its part, the extended NF entity (CA_NFExt) may be configured to send the information that is relevant to generate the context towards the controlling entity (CA_NF), and it may also be configured to receive, when the NF entity is impacted by the generated context, the context-related information from the controlling entity (CA_NF).

As can be seen in FIG. 2, the network management entity (OSS) and the coordination entity (CA_CF) may be implemented into the management plane (MP), while the controlling entity (CA_NF) and the one or more NF entities may be implemented in the control plane (CP) and/or the user plane (UP).

In the following, the drawings of FIGS. 3 to 6 illustrate a sequence of steps about the manner the specific function entities (CA_NF, CA_OSSExt, CA_CF, CA_NFExt) of the enhanced end-to-end (E2E) slicing architecture 200 may communicate between themselves using the specific interfaces (If-CA_NF, If-CA_MP, If-CAC_OSS) while handling the different types of context that can be generated.

Figure 3:
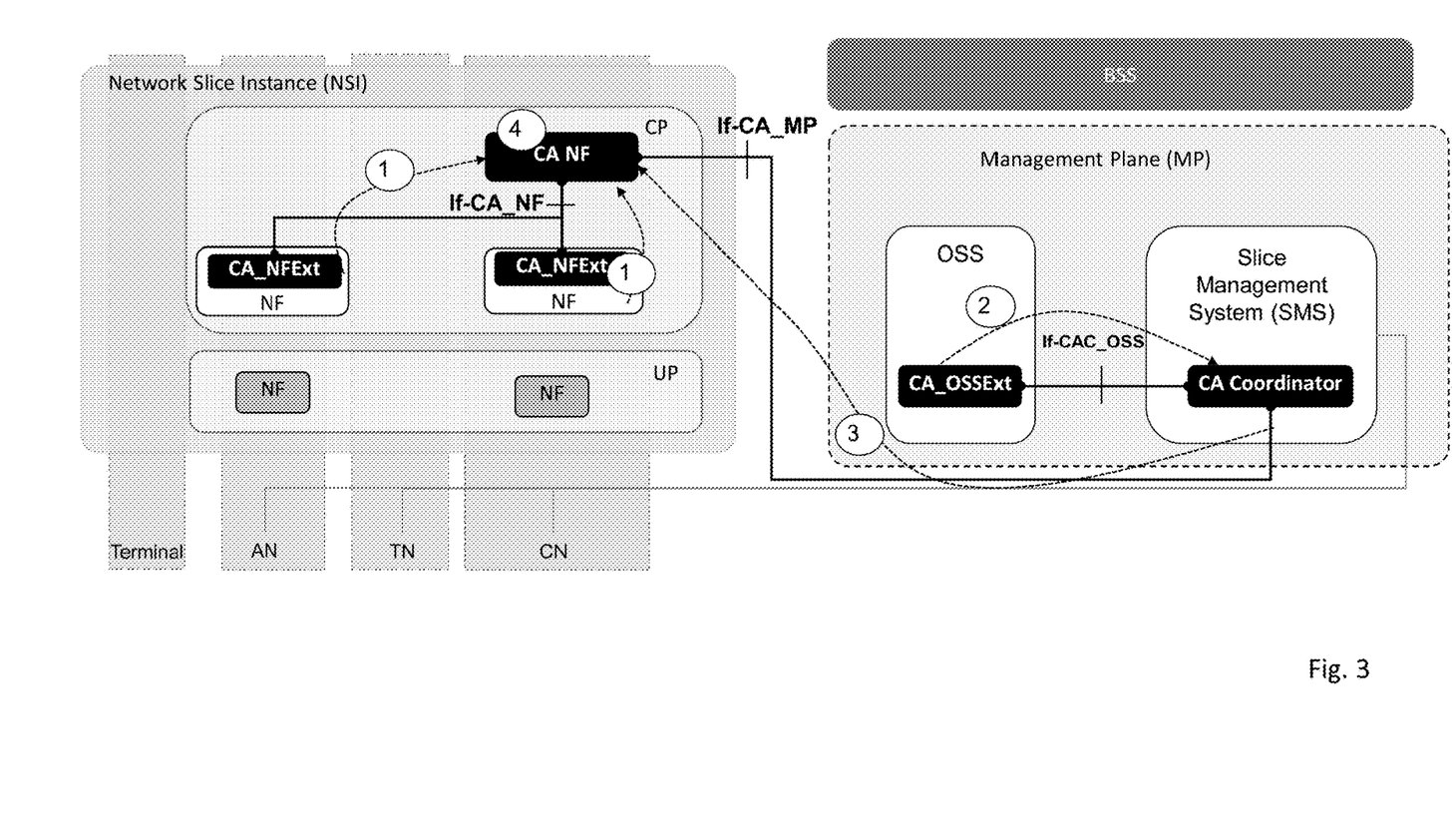
FIG. 3 shows a first sequence of steps (numbered from 1 to 4) about the manner the specific function entities (CA_NF, CA_OSSExt, CA_CF, CA_NFExt) of the enhanced end-to-end (E2E) slicing architecture 200 may communicate between themselves while handling any type of generated context, according to an embodiment of the present application.

FIG. 3 shows a first sequence of steps (depicted by the numbers "1", "2", "3" and "4", respectively) applicable to any type of generated context, according to an embodiment of the present application.

In the step 1, the information, which is monitored from different sources (e.g., CP NF entities for the NF entities deployed in the CP and/or UP NF entities for the NF entities deployed in the UP) of the NSI and is relevant to generate a context, is respectively sent towards the controlling entity (CA_NF) via each respective If-CA_NF interface.

In the step 2, the information, which is monitored by the network management entity (OSS) and is relevant to generate the context, is sent from the extended network management entity (CA_OSSExt) towards the coordination entity (CA_CF, CA coordinator) of the SMS via the If-CAC_OSS interface.

In the step 3, the coordination entity (CA_CF, CA coordinator) acts as a relay of the monitored information received from the extended network management entity (CA_OSSExt) or optionally received directly from the SMS, and sends this monitored information towards the controlling entity (CA_NF) via the If-CA_MP interface.

In the step 4, the controlling entity (CA_NF) generates a context-related information based on the monitored information and in any context model as defined above by the tuples (<first entity>) and/or (<first entity>, <second entity>).

It should be noted that the steps 1 and 3 may occur at the same time and not sequentially. Indeed, the illustration shows the propagation of the information as sequential steps only for explanation purposes, so that it should be understood that the enumeration of the steps does not necessarily represent a temporal execution order.

Figure 4:
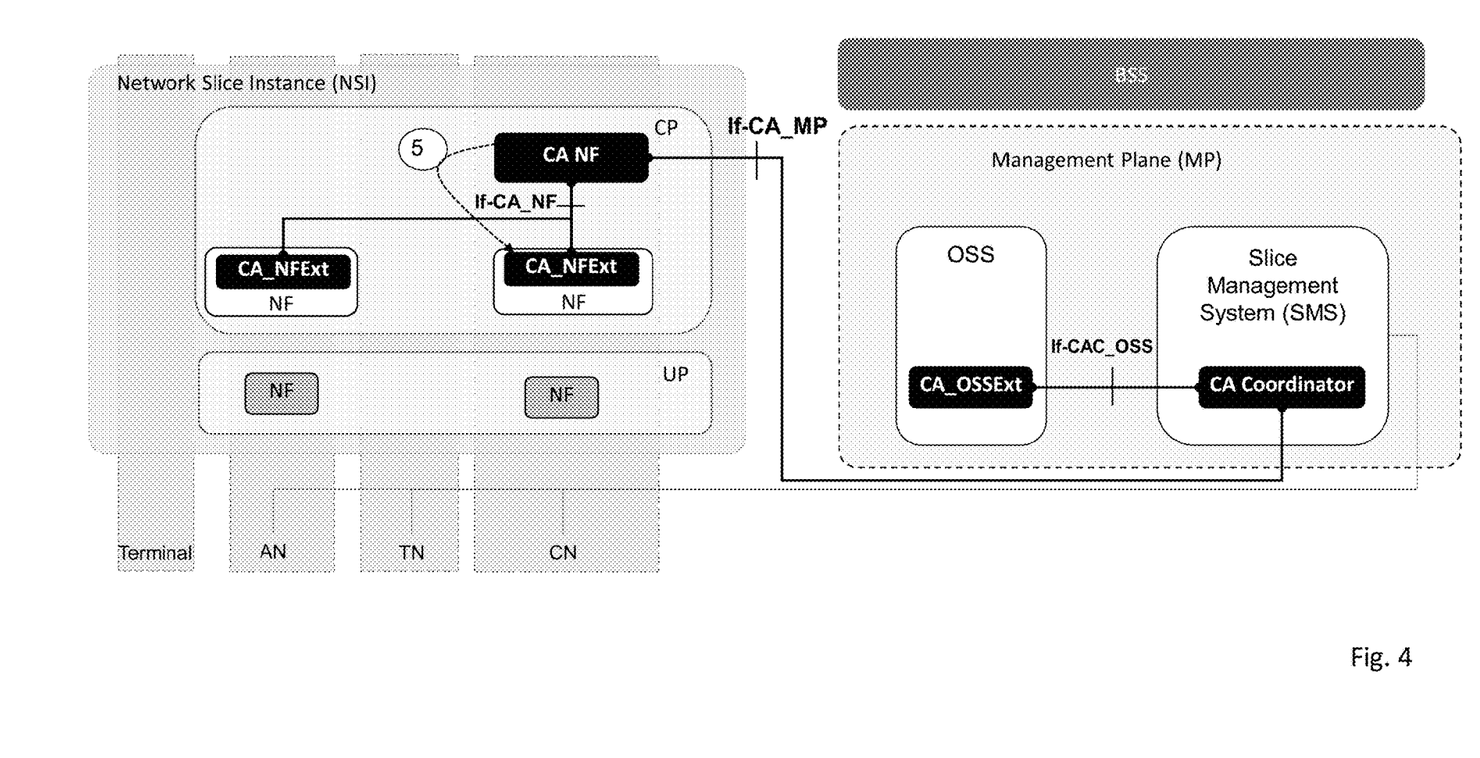
FIG. 4 shows a second sequence of steps (numbered 5) about the manner the specific function entities (CA_NF, CA_OSSExt, CA_CF, CA_NFExt) of the enhanced end-to-end (E2E) slicing architecture 200 may communicate between themselves while handling a "CP only" type of generated context, according to an embodiment of the present application.

FIG. 4 shows a second sequence of steps (depicted by the number "5") applicable to a "CP only" type of generated context, according to an embodiment of the present application.

In the step 5, the controlling entity (CA_NF) sends the generated context towards an NF entity (e.g., the CP NF entity as depicted in FIG. 4) that is registered to receive it. Then, based on the generated context, the NF entity will eventually make changes, for example, in order to optimize, among others, CP procedures (e.g., concerning mobility management, device location and reachability, session management, authentication and authorization, etc.), access and core resources utilization (e.g., radio resources, transport resources, etc.), and selection and utilization of UPFs.

Figure 5:
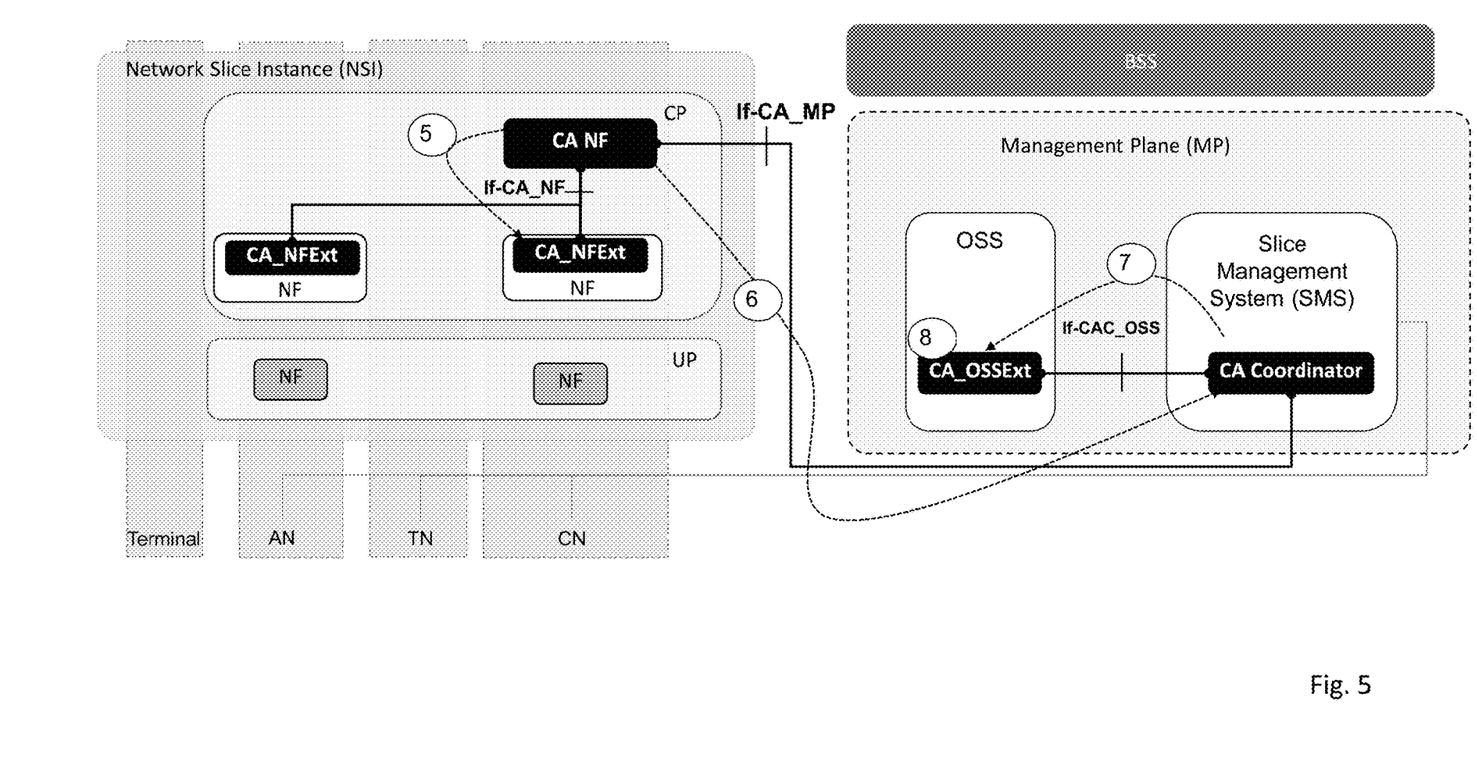
FIG. 5 shows a third sequence of steps (numbered from 5 to 8) about the manner the specific function entities (CA_NF, CA_OSSExt, CA_CF, CA_NFExt) of the enhanced end-to-end (E2E) slicing architecture 200 may communicate between themselves while handling a "CP-MP" type of generated context, according to an embodiment of the present application.

FIG. 5 shows a third sequence of steps (depicted by the numbers "5", "6", "7" and "8") applicable to a "CP-MP" type of generated context, according to an embodiment of the present application.

In the step 5, the controlling entity (CA_NF) sends the generated context towards an NF entity (e.g., the CP NF entity as depicted in FIG. 5) that is registered to receive it.

In the step 6, the controlling entity (CA_NF) also sends a notification message about the specific type (i.e., CP-MP in the present case) of the generated context towards the coordination entity (CA_CF, CA coordinator).

In the step 7, upon receiving the notification message from the controlling entity (CA_NF), the coordination entity (CA_CF, CA coordinator) relays such a notification message towards the extended network management entity (CA_OSSExt).

In the step 8, based on the received notification message, the extended network management entity (CA_OSSExt) will trigger or enforce the mechanisms at the network management entity (OSS) in order to block, therein and for a period of time, any change related to the notified context, the period of time being greater than or equal to a time required for the one or more NF entities concerned by the generated context to enforce the change.

It should be noted that the steps 5 and 6 may occur at the same time and not sequentially. Indeed, the illustration shows the propagation of the generated context as sequential steps only for explanation purposes, so that it should be understood that the enumeration of the steps does not necessarily represent a temporal execution order.

Figure 6:
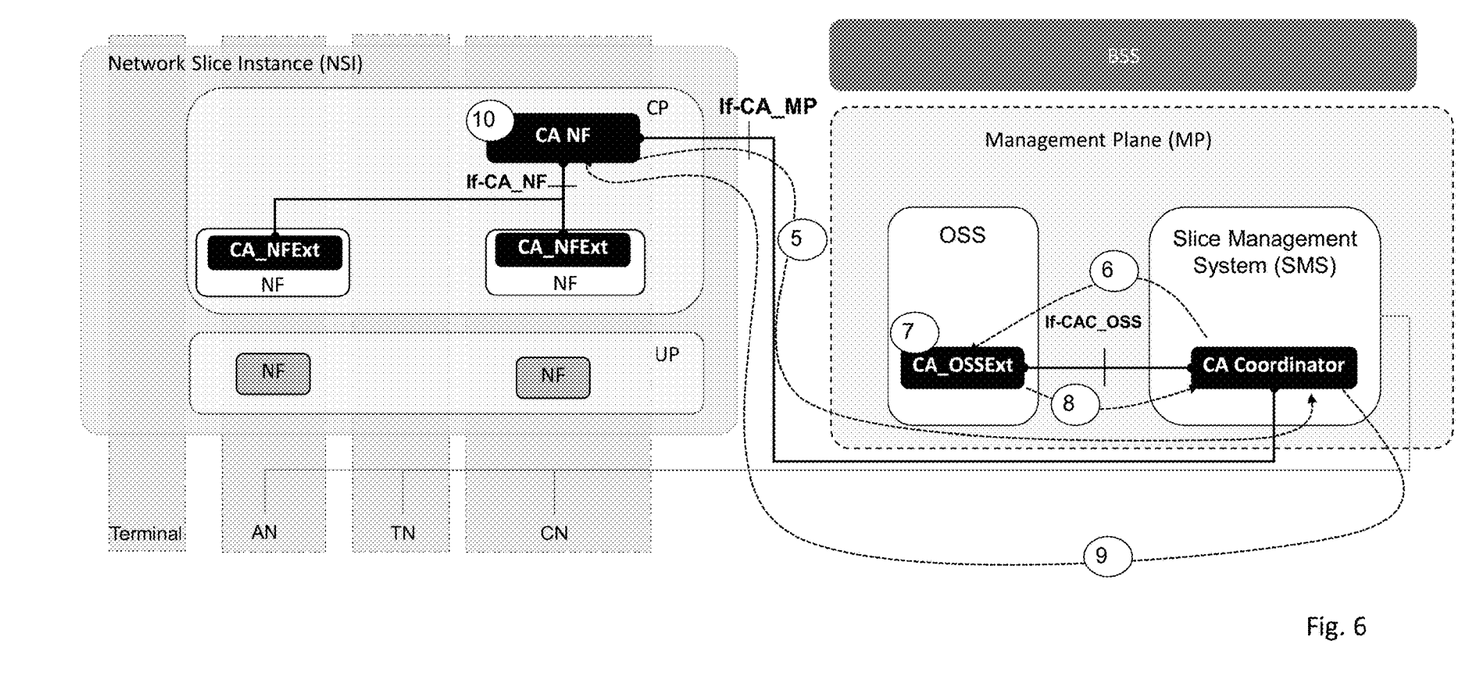
FIG. 6 shows a fourth sequence of steps (numbered from 5 to 10) about the manner the specific function entities (CA_NF, CA_OSSExt, CA_CF, CA_NFExt) of the enhanced end-to-end (E2E) slicing architecture 200 may communicate between themselves while handling a "MP-CP" type of generated context, according to an embodiment of the present application.

FIG. 6 shows a fourth sequence of steps (depicted by the numbers "5", "6", "7", "8", "9" and "10") applicable to a "MP-CP" type of generated context, according to an embodiment of the present application.

In the step 5, the controlling entity (CA_NF) sends the generated context towards the coordination entity (CA_CF, CA coordinator).

In the step 6, the coordination entity (CA_CF, CA coordinator) receives a "MP-CP" type of generated context and forwards it towards the extended network management entity (CA_OSSExt), which in turns delivers the generated context towards the network management entity (OSS).

In the step 7, if the network management entity (OSS) decides, based on the receipt of the generated context, to trigger or enforce a change on the operation of the entities of the NSI, then the network management entity (OSS) notifies the extended network management entity (CA_OSSExt).

In the step 8, the extended network management entity (CA_OSSExt) notifies the coordination entity (CA_CF, CA coordinator) that a change, from the MP perspective, may be enforced by the network management entity (OSS) of the MP in entities of the NSI associated with the received context.

In the step 9, upon receiving, from the extended network management entity (CA_OSSExt), the notification message about the change to be enforced, the coordination entity (CA_CF, CA coordinator) forwards this notification message towards the controlling entity (CA_NF).

In the step 10, upon receiving, from the coordination entity (CA_CF, CA coordinator), the notification message about the change to be enforced, the controlling entity (CA_NF) blocks, for a period of time that is greater than or equal to a time required for the network management entity (OSS) to enforce the change, the generation of any context and/or the transmission of any generated context towards the NF entities of the NSI in order to avoid that both MP and CP/UP perform simultaneous changes in the NSI.

It should be noted that the enhanced end-to-end (E2E) slicing architecture 200 may be supported by a mobile core network (MCN) comprising at least the controlling entity (CA_NF), the network management entity (OSS), the one or more NF entities and the coordination entity (CA_CF).

Figure 7:
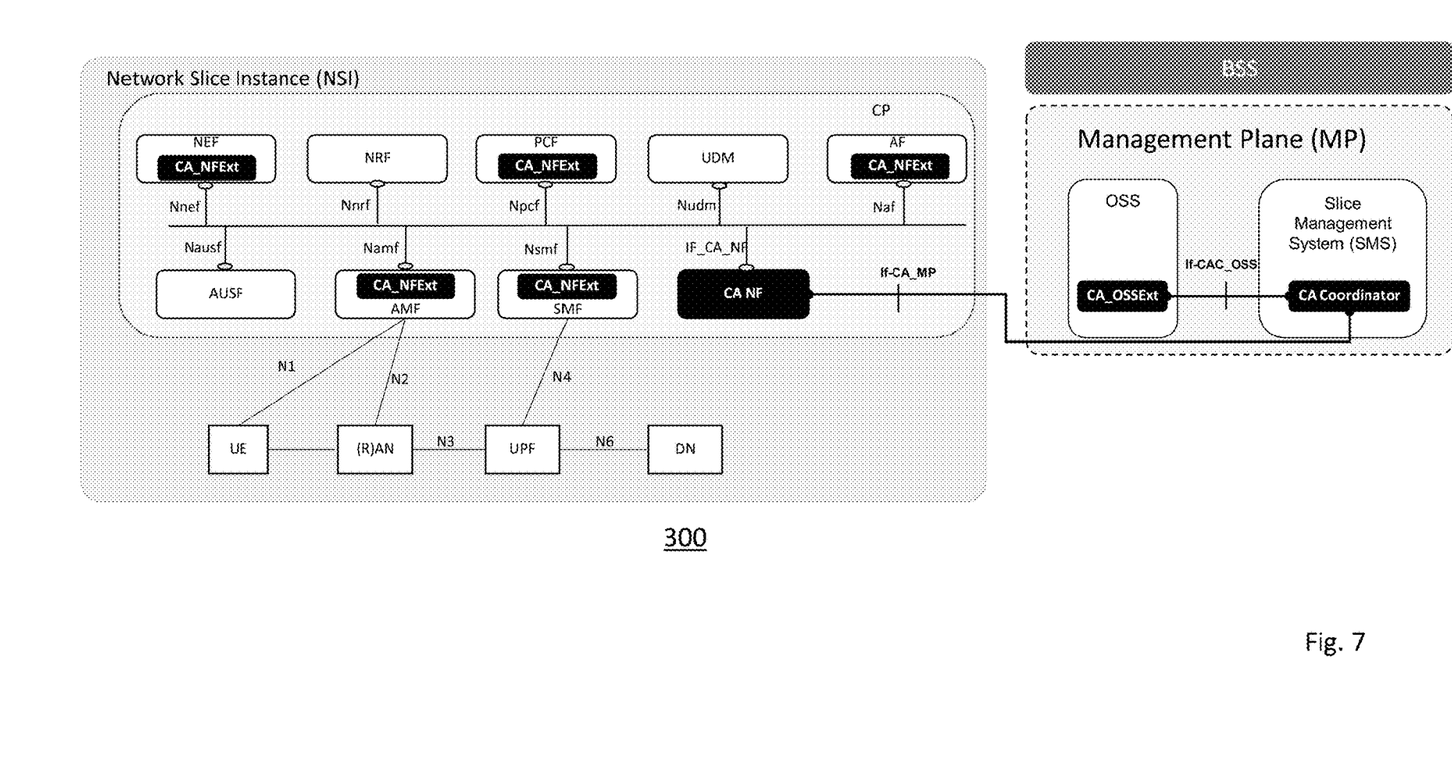
FIG. 7 shows an enhanced end-to-end (E2E) slicing architecture 300 based on the enhanced end-to-end (E2E) slicing architecture 200 and a 3GPP control plane (CP) architecture, according to an embodiment of the present application.

In an exemplary and non-limiting implementation of the specific function entities and interfaces of the present application, FIG. 7 shows an enhanced end-to-end (E2E) slicing architecture 300 based on the enhanced end-to-end (E2E) slicing architecture 200 and the 3GPP control plane (CP) architecture from 3GPP TS 23.501, according to an embodiment of the present application.

The left side of FIG. 7 shows the main NF entities (NEF, NRF, PCF, UDM, AF, AUSF, AMF, SMF) deployed in the CP, their service-based interfaces (Nnef, Nnrf, Npcf, Nudm, Naf, Nausf, Namf, Nsmf) and the interfaces (N1, N2, N3, N4, N6) between the core network (CN) and the UP, as defined in 3GPP TS 23.501, into which the specific function entities (CA_NF, CA_NFExt) and interfaces (If-CA_NF, If-CA_MP) of the enhanced end-to-end (E2E) slicing architecture 200 have been implemented. The right side of FIG. 7 shows the specific function entities of the MP (CA_OSSExt, CA_CF) and the specific interface (If-CAC_OSS) of the enhanced end-to-end (E2E) slicing architecture 200.

In line with 3GPP TS 23.501, the implemented If-CA_NF interface may be defined as a service-based interface. Via such an interface, any NF entity can invoke the services (i.e., the functionalities) provided by the controlling entity (CA_NF). In addition, some existing NF entities from the 3GPP TS 23.501 technical specification have been functionally extended as to become extended 3GPP NF entities that can operate using the context as generated by the controlling entity (CA_NF) in the present application. Amongst the extended 3GPP NF entities as depicted in FIG. 7, the following ones can be listed in a non-limiting enumeration:

NEF (network exposure function): functionally extended to be able to receive and expose the generated contexts to any other NF entity or external applications to the CN;

PCF (policy control function): functionally extended to send information to CA_NF and consume the contexts generated by the controlling entity (CA_NF), so that the PCF can optimize the policies to be applied;

AF (application function): functionally extended to allow applications to send information towards the controlling entity (CA_NF) and to consume the contexts generated by the controlling entity (CA_NF) with the aim of making decisions about whether or not to improve the performance of the application operation;

AMF (access and mobility management function): functionally extended to send information and to consume the contexts generated by the controlling entity (CA_NF) with the aim of optimizing the AN operation and mobility support; and SMF (session management function): functionally extended to send information and to consume the contexts generated by the controlling entity (CA_NF) with the aim of optimizing the management of ongoing sessions as well the establishment of new sessions.

It should however be noted that other existing NF entities, found in the 3GPP TS 23.501 technical specification and not depicted in FIG. 7, may also be functionally extended as to become extended 3GPP NF entities that can operate using the context as generated by the controlling entity (CA_NF) in the present application.

The other specific function entities (CA_CF, CA_OSSExt) and interfaces (If-CA_MP, If-CAC_OSS) defined in the present application are embedded into the MP of the enhanced end-to-end (E2E) slicing architecture 300, wherein the IF-CA_MP interface connects the CA_NF entity at the CP to the CA_CF entity at the MP.

Figure 8:
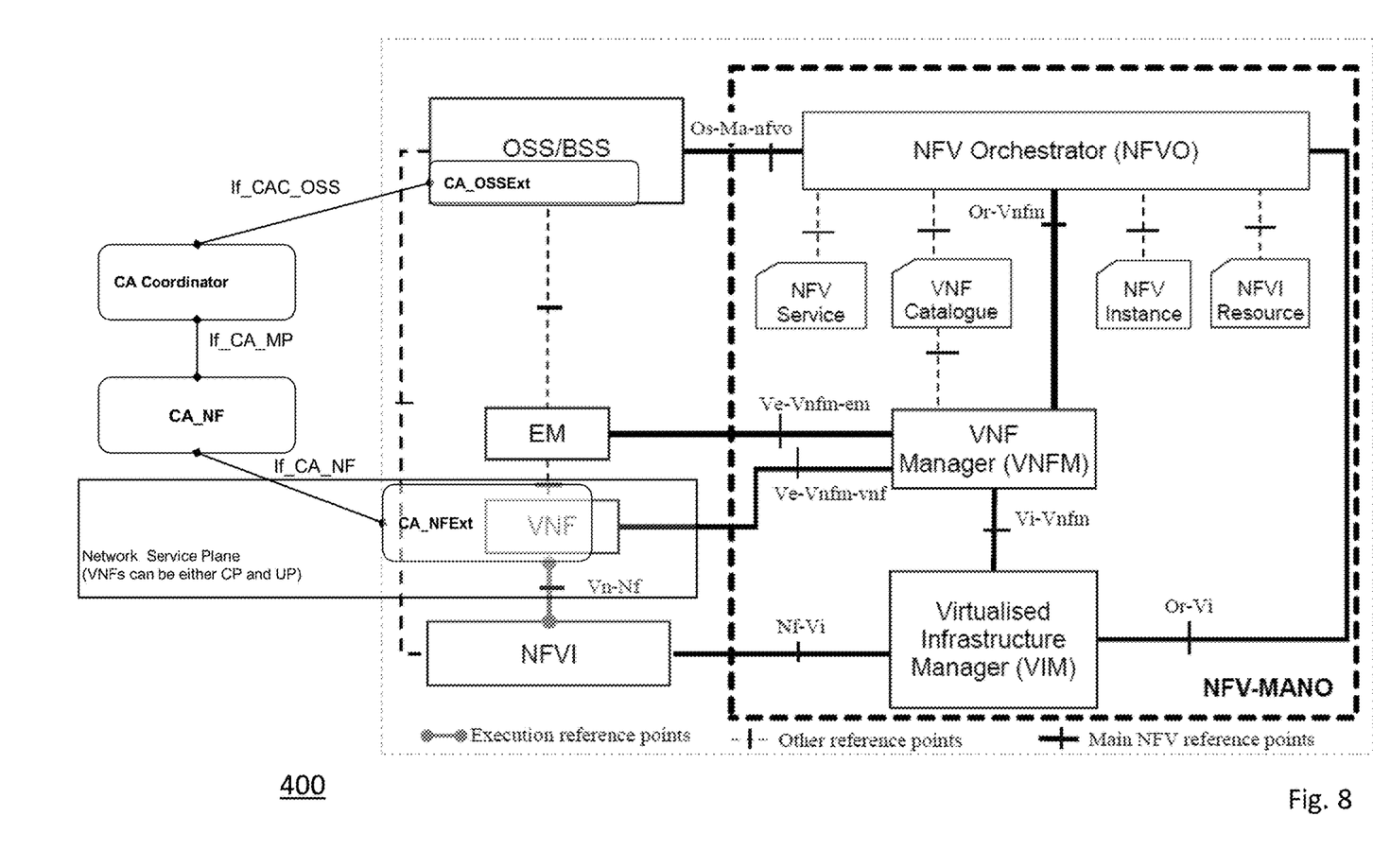
FIG. 8 shows an enhanced European telecommunications standards institute (ETSI) network function virtualization (NFV) management and orchestration (MANO) architecture 400, according to an embodiment of the present application.

In comparison with the enhanced end-to-end (E2E) slicing architecture 200, a virtual network function (VNF) entity in a management and orchestration (MANO) framework will be assumed to be equivalent to an NF entity of the NSI. However, no NSI is depicted in FIG. 8. Moreover, the SMS is not fully covered by the MANO framework, which only considers the existence of the OSS/BSS, and the MANO framework itself cannot be equivalent to the SMS. However, it comprises some of the functionalities that must be provided by a SMS when it comes to managing the NF entities, i.e., the VNF entities.

In an exemplary and non-limiting implementation of the specific function entities and interfaces of the present application, FIG. 8 shows an enhanced European telecommunications standards institute (ETSI) network functions virtualization (NFV) MANO architecture 400, according to an embodiment of the present application. The enhanced ETSI NFV MANO architecture 400 is based on the NFV-MANO functional blocks and reference points as illustrated in FIG. 4.1.1 of the group specification (GS) entitled: ETSI GS NFV-IFA 009 v1.1.1 (2016 July). Therein, definitions and details, applicable to its functional blocks, reference points and interfaces as also illustrated in FIG. 8, are disclosed.

In the embodiment of FIG. 8, the CA_NF entity is a standalone NF entity, i.e., it is not deployed as a VNF entity by the MANO framework for a given NSI. This means that the VNF entities deployed and managed by the MANO framework are the NF entities of the CP and UP. Each VNF entity is then functionally extended as to obtain a respective CA_NFExt entity as proposed in the present application. In addition, the coordination entity (CA_CF) is not under the control or management of the MANO framework itself. It is also a standalone entity. The mapping of the interfaces proposed in this embodiment of the present application is straightforward. The VNF entity with the CA_NFExt entity is connected to the CA_NF entity via the if-CA_NF interface. The CA_NF entity and the coordination entity (CA_CF) are connected to each other via the If-CA_MP interface. The OSS is functionally extended as to obtain the CA_OSSExt entity, which is connected to the coordination entity (CA_CF) via the If-CAC_OSS interface.

Figure 9:
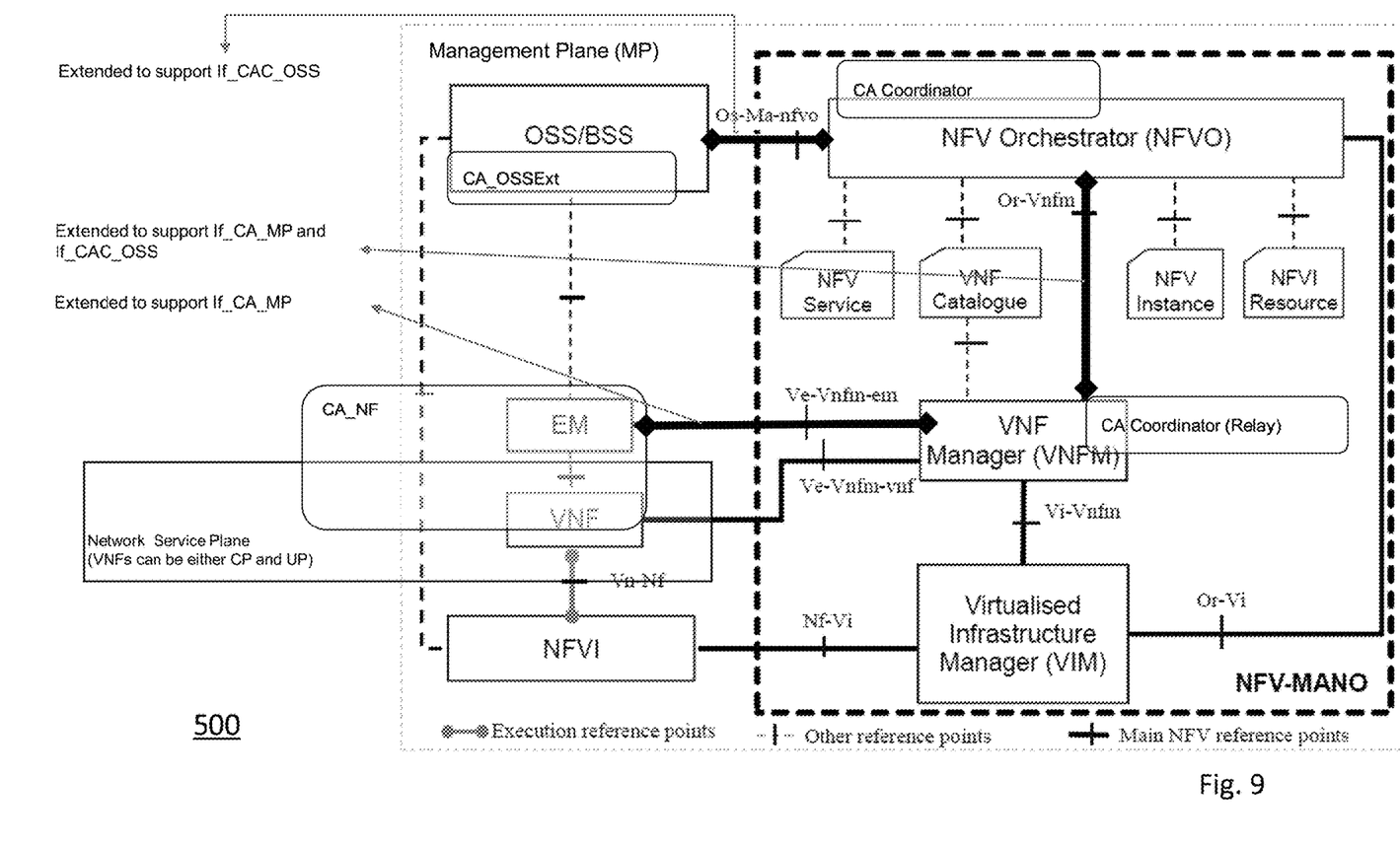
FIG. 9 shows an enhanced ETSI NFV MANO architecture 500, according to an embodiment of the present application.

In another exemplary and non-limiting implementation of the specific function entities and interfaces of the present application, FIG. 9 shows an enhanced ETSI NFV MANO architecture 500, according to an embodiment of the present application. The enhanced ETSI NFV MANO architecture 500 is based on the NFV-MANO functional blocks and reference points as illustrated in FIG. 4.1.1 of the GS document entitled: ETSI GS NFV-IFA 009 v1.1.1 (2016 July). Therein, definitions and details, applicable to its functional blocks, reference points and interfaces as also illustrated in FIG. 9, are disclosed.

In this other embodiment of FIG. 9, the specific function entities and interfaces defined in the present application are tightly integrated with the MANO framework. Some of the functionalities of these specific function entities and interfaces need to be split into different parts of the MANO framework. For example, the functionalities of the coordination entity (CA_CF) need to be split into the NFV orchestrator (NFVO) and at the VNF manager (VNFM). In this case, the NFVO can be extended with all key functionalities of the coordination entity (CA_CF), while the VNFM can be extended in order to serve as a relay for the coordination entity (CA_CF), which is embedded into the NFVO to allow messages from the CP of the CN to reach the coordination entity (CA_CF).

Another aspect of this embodiment of FIG. 9 is that a CA_NF entity can be considered as a VNF entity that is deployed and managed by the MANO framework. In this case, the functionalities of the CA_NF entity are split between the element manager (EM) of the MANO framework and the VNF entity, which is the CA_NF entity itself. Moreover, neither the CA_NFExt entity nor the If-CA_NF interface are depicted in FIG. 9, whereas they are depicted in FIG. 8 and are connected to the CA_NF entity. The other specific interfaces (If-CA_MP, If-CAC_OSS) defined in the present application can be implemented as extensions of existing interfaces in the MANO framework. In particular, the Ve-Vnfm-em interface from the MANO framework can be extended with the functionalities of the If-CA_MP interface. In addition, the Or-Vnfm interface from the MANO framework can be extended with the capabilities of both If-CA_MP and If-CAC_OSS interfaces because the VNFM entity of the MANO framework can also behave as a relay of the coordination entity (CA_CF). Moreover, the Or-Manfvo interface from the MANO framework can be extended with the capabilities of the If-CAC_OSS interface.

In summary, the present application relates to a MCN supporting E2E network slicing, which comprises a controlling entity (CA_NF), one or more NF entities extended with functionalities (CA-NFExt), a network management entity (OSS) extended with functionalities (CA_OSSExt) and a coordination entity (CA_CF). The CA_NF communicates with the CA_OSSExt through the CA_CF using first (If-CA_MP) and third interfaces (If-CAC_OSS), and with the one or more extended NF entities (CA-NFExt) using a respective second interface (If-CA_NF) and/or other NFs interfaces. Based on information received from the OSS and the one or more NF entities, the CA_NF generates a context with a certain type, sends, based on the generated context, context-related information towards any entity that is impacted by the generated context amongst the one or more NF entities and the OSS, and blocks, for a period of time, a transmission of any generated context towards the one or more NF entities upon receiving, from the OSS, a notification message once the OSS decides to enforce a change upon receiving the generated context from the CA_NF. On the other hand, the extended network management entity (CA_OSSExt) blocks, for a period of time, any change at the network management entity (OSS) upon receiving a notification message from the controlling entity (CA_NF).

Furthermore, by closing the decision-making loop between the CP and MP entities using context awareness thanks to an inter-communication between controlling entity (CA_NF) and network management entity (OSS), the present application has, in a non-limiting enumeration, the following benefits:

- to enable information about the status of entities of the system kept in the MP to be considered in the decision-making of the NF entities deployed in the CP;
- to reduce the occurrence of unnecessary or multiple changes at the MP and the CP for solving a situation involving related entities or entities in the same geographical region. For instance, the present application may reduce the occurrence of performing a gateway relocation at the CP and simultaneously changing the infrastructure resources associated with the same gateway involved in the relocation at the CP; and
- to have the potential to reduce the need for long-term capacity planning and pre-provisioning of infrastructure resources in order to guarantee the expected performance of mobile network services. For example, in 4G, quality of service (QoS) class identifier (QCI) has a budget of delay that is expected to be provisioned at the infrastructure by the MP. This means that it is first necessary to understand what the characteristics of the mobile traffic are, prior to dimensioning and pre-provisioning the network up front for such demand. With respect to 4G, the present application has the potential to make the adjustments more dynamically, thereby reducing the possibility for over provisioning.

While the present application has been illustrated and described in detail in the drawings and the foregoing description, such illustration and description are to be considered illustrative or exemplary and not restrictive. The application is not limited to the disclosed embodiments. From reading the present disclosure, other modifications will be apparent to a person skilled in the art. Such modifications may involve other features, which are already known in the art and may be used instead of or in addition to features already described herein.

The application has been described in conjunction with various embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present application has been described with reference to specific features and embodiments thereof, it is evident that various modifications and combinations can be made thereto without departing from the scope of the invention. The specification and drawings are, accordingly, to be regarded simply as an illustration of the application as defined by the appended claims, and are contemplated to cover any and all modifications, variations, combinations or equivalents that fall within the scope of the present invention.

What is claimed is:

1. A method, performed at a controlling entity, for communicating with a network management entity and one or more network function (NF) entities, the method comprising:
   receiving information from the one or more NF entities and from the network management entity, the received information being relevant to generate a context;
   generating the context based on the received information;
   based on the generated context, sending context-related information towards one or more entities that are impacted by the generated context, the one or more impacted entities being selected from the one or more NF entities and the network management entity; and
   blocking, for a first period of time, transmission of any generated context towards the one or more NF entities upon receiving a notification message from the network management entity,
   wherein the notification message is generated by the network management entity once the network management entity decides to enforce a change upon receiving the generated context derived from the context-related information; and
   wherein the first period of time is greater than or equal to a second period of time required for the network management entity to enforce the change.

2. The method of claim 1, wherein the information from the network management entity is received using a first interface; and
   wherein the information from the one or more NF entities is received using a respective second interface.

3. The method of claim 2, wherein the context-related information is sent towards the network management entity using the first interface when the network management entity is an impacted entity; and
   wherein the context-related information is sent towards a respective one of the one or more NF entities using the second interface when the respective one of the one or more NF entities is an impacted entity.

4. The method of claim 3, wherein the context-related information sent towards an impacted entity configured to enforce the change upon receiving the generated context includes the generated context; and
   wherein the context-related information sent towards an impacted entity configured to be influenced by the enforced change includes a notification message about a type of the generated context.

5. The method of claim 4, wherein the type of the generated context has a format giving an indication about only a first entity comprising the impacted entity configured to enforce the change, or about the first entity comprising the impacted entity configured to enforce the change together with a second entity comprising the impacted entity configured to be influenced by the enforced change;
   wherein the second entity is other than the first entity; and
   wherein the one or more NF entities are deployed in the first entity and the network management entity is deployed in the second entity, or the one or more NF entities are deployed in the second entity and the network management entity is deployed in the first entity.

6. A non-transitory computer readable medium, comprising a program code, wherein when executed by a processor, the program code causes the processor to perform a method comprising:
- receiving information from one or more network function (NF) entities and from a network management entity, the received information being relevant to generate a context;
- generating the context based on the received information;
- based on the generated context, sending context-related information towards one or more entities that are impacted by the generated context, the one or more entities being selected from the one or more NF entities and the network management entity; and
- blocking, for a first period of time, transmission of any generated context towards the one or more NF entities upon receiving a notification message from the network management entity,
- wherein the notification message is generated by the network management entity once the network management entity decides to enforce a change upon receiving the generated context derived from the context-related information; and
- wherein the first period of time is greater than or equal to a second period of time required for the network management entity to enforce the change.

7. The non-transitory computer readable medium of claim 6, wherein the information from the network management entity is received using a first interface; and
- wherein the information from the one or more NF entities is received using a respective second interface.

8. The non-transitory computer readable medium of claim 7, wherein the context-related information is sent towards the network management entity using the first interface when the network management entity is an impacted entity; and
- wherein the context-related information is sent towards a respective one of the one or more NF entities using the second interface when the respective one of the one or more NF entities is an impacted entity.

9. The non-transitory computer readable medium of claim 8, wherein the context-related information sent towards an impacted entity configured to enforce the change upon receiving the generated context includes the generated context; and
- wherein the context-related information sent towards an impacted entity configured to be influenced by the enforced change includes a notification message about a type of the generated context.

10. The non-transitory computer readable medium of claim 9, wherein the type of the generated context has a format giving an indication about only a first entity comprising the impacted entity that is configured to enforce the change, or about the first entity comprising the impacted entity configured to enforce the change together with a second entity comprising the impacted entity configured to be influenced by the enforced change;
- wherein the second entity is other than the first entity; and
- wherein the one or more NF entities are deployed in the first entity and the network management entity is deployed in the second entity, or the one or more NF entities are deployed in the second entity and the network management entity is deployed in the first entity.

11. A controlling entity configured to communicate with a network management entity and one or more network function (NF) entities, the controlling entity comprising:
- a processor being configured to:
- receive information from the one or more NF entities and from the network management entity, the received information being relevant to generate a context;
- generate the context based on the received information;
- based on the generated context, send context-related information towards one or more impacted entities that are impacted by the generated context, the one or more impacted entities being selected from the one or more NF entities and the network management entity; and
- block, for a first period of time, transmission of the generated context towards the one or more NF entities upon receiving a notification message from the network management entity,
- wherein the notification message is generated by the network management entity once the network management entity decides to enforce a change upon receiving the generated context from the controlling entity, and
- wherein the first period of time is greater than or equal to a second period of time required for the network management entity to enforce the change.

12. The controlling entity of claim 11, wherein the information from the network management entity is received using a first interface; and
- wherein the information from the one or more NF entities is received using a respective second interface.

13. The controlling entity of claim 12, wherein the context-related information is sent towards the network management entity using the first interface when the network management entity is an impacted entity; and
- wherein the context-related information is sent towards a respective one of the one or more NF entities using the second interface when the respective one of the one or more NF entities is an impacted entity.

14. The controlling entity of claim 13, wherein the context-related information sent towards an impacted entity configured to enforce the change upon receiving the generated context includes the generated context; and
- wherein the context-related information sent towards an impacted entity configured to be influenced by the enforced change includes a notification message about a type of the generated context.

15. The controlling entity of claim 14, wherein the type of the generated context has a format giving an indication about only a first entity comprising the impacted entity configured to enforce the change, or about the first entity comprising the impacted entity configured to enforce the change together with a second entity comprising the impacted entity configured to be influenced by the enforced change;
- wherein the second entity is other than the first entity; and
- wherein the one or more NF entities are deployed in the first entity and the network management entity is deployed in the second entity, or the one or more NF entities are deployed in the second entity and the network management entity is deployed in the first entity.

\* \* \* \* \*

UNITED STATES PATENT AND TRADEMARK OFFICE
CERTIFICATE OF CORRECTION

PATENT NO. : 11,240,096 B2
APPLICATION NO. : 16/714061
DATED : February 1, 2022
INVENTOR(S) : Marquezan et al.

It is certified that error appears in the above-identified patent and that said Letters Patent is hereby corrected as shown below:

On the Title Page

Page 2, Other Publications, Citation 3: "Chatras et al., "NFV Enabling Network Slicing for SG," XP033085379," should read -- Chatras et al., "NFV Enabling Network Slicing for 5G," XP033085379, --.

Signed and Sealed this
Tenth Day of May, 2022

Katherine Kelly Vidal
*Director of the United States Patent and Trademark Office*